Nov. 7, 1967    J. C. MOERKENS    3,351,810
CONTROL CIRCUIT FOR REGULATING THE POWER SUPPLIED TO A
NON-LINEAR LOAD FROM A SOURCE OF A.C. VOLTAGE
Filed April 1, 1965    2 Sheets-Sheet 1

INVENTOR.
JOZEF C. MOERKENS
BY
AGENT

United States Patent Office 3,351,810
Patented Nov. 7, 1967

3,351,810
CONTROL CIRCUIT FOR REGULATING THE POWER SUPPLIED TO A NON-LINEAR LOAD FROM A SOURCE OF A.C. VOLTAGE
Jozef Cornelis Moerkens, Emmasingel, Eindhoven, Netherlands, assignor to North American Philips Company, Inc., New York, N.Y., a corporation of Delaware
Filed Apr. 1, 1965, Ser. No. 444,588
9 Claims. (Cl. 315—194)

This invention relates to a control circuit for supplying a non-ohmic non-linear load, more particularly, an inductively stabilized gas and/or vapour discharge tube, with alternating current which is supplied to the load by means of a pair of semiconductor controlled rectifiers connected in inverse-parallel arrangement.

A controlled rectifier is to be understood herein to denote an electrical device in which a current is passed between two main electrodes in one direction in dependence upon a voltage at a control electrole. A voltage at a control electrode is referred to as a control voltage.

The control electrodes of the said rectifiers are generally connected to a control circuit. With the aid of this control circuit, the rectifiers may be rendered conductive at given instants and for given time intervals.

It is known to supply to such a control circuit, also referred to as control electrode circuit, an alternating current which is equal to the alternating voltage supplied to the main electrode circuit. It is also known that the relative phase angle at which the alternating current is switched on by the control voltages can be made variable, at least in dependence upon the alternating voltage supplied to the main electrode circuit.

In the known arrangement, the effect of variations of the supply voltage on the power absorption of the load are compensated to a certain extent. For this purpose, a parallel transducer is arranged in the control circuit. Since this transducer is also used for the manual adjustment of a given power absorption of the load, the compensation of large variations of the supply voltage is not always of high quality.

The invention has for an object to render the power absorption of the tube to a considerable extent independent of the value of the voltage which is supplied to the main electrode circuit.

For this purpose, according to the invention, use is made of an arrangement for feeding a non-ohmic non-linear load, particularly as inductively stabilised gas and/or vapour discharge tube, with alternating current which is supplied to the load through controlled rectifiers connected in antiparallel arrangement. The alternating voltage supplied to the main electrode circuit is the same as the alternating voltage supplied to the control electrode circuit and the relative phase angle at which the alternating current is switched on by control voltages supplied to the controlled rectifiers is made variable, at least in dependence upon the alternating voltage supplied to the main electrode circuit. The arrangement is characterized by a control electrode circuit which comprises the series combination of at least an impedance and a non-linear element having terminals to which the alternating voltage is supplied, the resistance of the non-linear element above a given current intensity being approximately inversely proportional to the current intensity of this element. The voltage across the non-linear element is supplied to a control electrode of a controlled rectifier so that a variation in the value of the alternating supply voltage produces a phase shift of the control voltage in the same direction as the phase shift to which the current in the main electrode circuit is subjected as a result of the said variation of the said alternating supply voltage.

A non-linear element is to be understood herein to mean an element having a non-linear current-voltage characteristic.

When the voltage supplied to the main electrode circuit increases, the load tends to absorb a different value of current from the supply lines. Moreover, the phase angle between the load current and the voltage supplied to the main electrodes has a tendency to vary. This is due to the fact that the load has a non-ohmic non-linear character. These two tendencies attempt to vary the power absorption of the tube.

The invention is based on the idea of introducing into the control circuit an electric image of the load of the main circuit. This image is constituted by the aforesaid series combination. Given electrical phenomena resulting from a variation of the alternating supply voltage then become manifest in approximately the same manner in the load circuit and in the control circuit. When these variations of the electrical situation of the control circuit are applied to the control electrodes of the controlled rectifiers in a suitable manner, the influence of a variation of the alternating supply voltage on the power absorption of the load may be counteracted. The electric image need not be perfect. However, phase shifts of the current with respect to the voltage, for example, should be oriented in both circuits in the same direction.

The electric image may be realized in different ways. Since in the present cases a variation of the supply voltage should be counteracted by a phase shift of the control voltage, it is desirable for the electric image to be constituted by the series combination of a second non-linear element and an impedance. The term "second" serves to distinguish this element from the non-linear load in the main electrode circuit. The second non-linear element must have such properties that the voltage at its terminals is substantially independent of the value of the voltage at the terminals of the series combination. The impendance connected in series with this element must be inductive in the case of an inductive load and must be capacitive in the case of a capacitive load in the main electrode circuit.

An electric image is obtained, for example, by using a gas discharge tube as the second non-linear element and proportioning the parts of the series combination so that the phase angle between the current through the series combination and the voltage across the series combination at a given value of the voltage supplied to the main electrode circuit has the same value and direction as the phase angle between the load current and the voltage supplied to the main electrode circuit, namely at the said given value of the last-mentioned voltage.

When the voltage supplied to the main electrode circuit increases, the voltage across the series combination of the control circuit also increases, but the value of the voltage at the second non-linear element remains substantially constant. Due to the resulting phase shift in the series combination, the phase of the voltage at the second non-linear element is likewise shifted. As a result, the phase of the control voltage, and consequently also the duration of the conducting period of the controlled rectifier, are varied. As will be explained hereinafter in greater detail with reference to FIGS. 3 and 4, it is thus possible to counteract the influence of a phase shift of the current in the main electrode circuit oriented in the same direction, which phase shift is also due to the increase of the alternating supply voltage.

As has already been stated, the electric image in the series combination need not be a perfect imitation of the load in the main circuit. Sometimes an incomplete imitation is even intentionally aimed at. This is due to the fact that with a complete imitation as described above, only a variation in the power absorption of the load is compensated which results from a variation of the phase angle between the load current and the alternating supply voltage caused by a variation of the latter voltage. However, the influence of a variation in the amplitude of the load current has been left out of consideration. This question will be discussed hereinafter.

As has been stated hereinbefore, the second non-linear element may be a gas discharge tube. An arrangement according to the invention is preferably provided with a second non-linear element in the form of two series-connected Zener diodes arranged in opposite senses. This has the advantage that the control circuit may be operated with lower voltages, as a result of which the various elements of the circuit may have smaller dimensions.

In the case of an inductive load in the main electrode circuit, the series combination of the control electrode circuit may comprise one or more impedances of common inductive character. These impedances may be located both on one side of the second non-linear element and on either side thereof. The series combination preferably consists of the second non-linear element and only one inductance in the form of a choke coil.

The series combination may be supplied through fixed impedances or be directly connected to the supply lines. In both cases, the main electrode circuit can absorb only a given power. This power may be largely independent of the line voltage. However, it is not possible to vary this power by re-adjustment. Preferably, however, the voltage supplied to the control electrode circuit is fed through an adjustable phase shift network to the series combination. By means of such an arrangement, the power absorption may be adjusted to different values. A newly adjusted power absorption may then also invariably be largely independent of the variations of the alternating supply voltage.

In an advantageous embodiment of the arrangement in accordance with the invention, the load is constituted by an inductively stabilized gas and/or vapor discharge tube and it is characterized in that the quotient of the value of the voltage across the series combination and the value of the voltage across the second non-linear element is smaller than the quotient of the value of the voltage supplied to the main electrode circuit and the value of the operating voltage of the discharge tube.

For further explanation, the following should be noted. Considering the rectangular vector triangle constituted by the voltages in the series combination, that is to say the voltage across the series combination (hypotenuse), the coil voltage and the voltage at the second non-linear element, according to the preferred embodiment described in the preceding paragraph, it is apparent that the phase angle between the last-mentioned voltage and the hypotenuse is smaller than the corresponding angle in the rectangular vector triangle of the inductively stabilized discharge tube. This implies that an increase in supply voltage, which produces an increase by the same percentage of the hypotenuses of the two vector triangles, enlarges the phase angle of the current of the series combination to a greater extent than the phase angle of the load current.

This has the advantage that it is now possible to counteract the influence of the increase in supply voltage on the power absorption due to an increase in the load current. See further also the description of FIGS. 3 and 4.

An arrangement in accordance with the invention has the additional advantage that the compensation of the variations of the supply voltage may be of such a high quality that it is even possible to operate the same arrangement both at a supply voltage of 190 v. and at a supply voltage of 240 v. Consequently, one universal apparatus suffices for this wide supply voltage range.

The invention will now be described more fully, by way of example, with reference to the accompanying drawing, in which.

Figure 1:
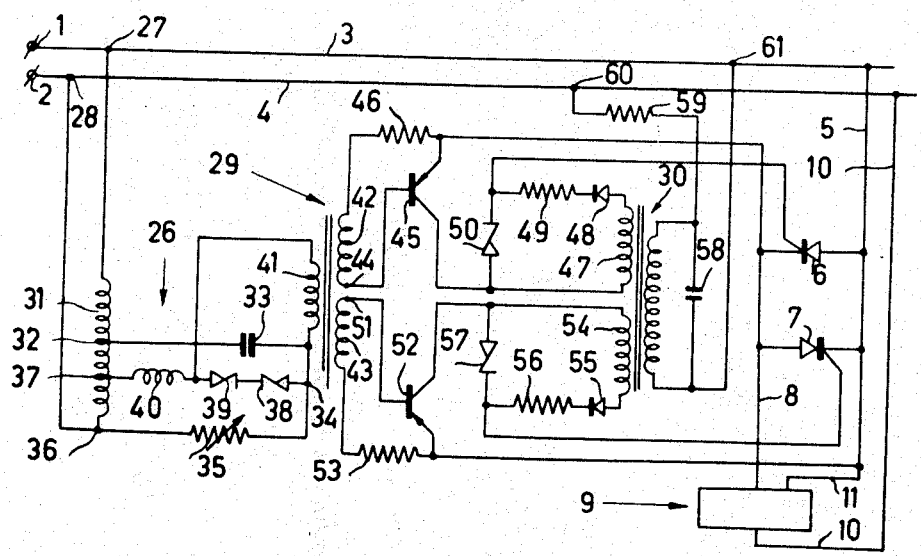
FIG. 1 shows an electric circuit diagram of the arrangement.

Referring now to FIG. 1, reference numerals 1 and 2 denote the connecting terminals of the arrangement. They are to be connected to an alternating voltage supply, of, for example, 220 v., 50 c./s. The current conductors 3 and 4 are connected to the terminals 1 and 2, respectively. The conductor 3 is connected through a line 5 to two silicon controlled rectifiers 6 and 7 connected in inverse-parallel arrangement. The other ends of these rectifiers are connected through a connecting line 8 to a load 9. The load 9 is connected through a line 10 to the conductor 4. For a reason which will be set out hereinafter, the load 9 is also connected to the conductor 3 through a line 11 in series with the line 5. The load 9 is constituted by low-pressure mercury vapour discharge lamps 12, 13 (see FIG. 2), each lamp being connected in series with choke coils 14 and 15, respectively. These series combinations are connected between the lines 8 and 10. In a practical embodiment, the lamps absorb approximately 40 w. The choke coils have an inductance of approximately 1.3 henry. In the embodiment, the lamp current lagged the supply voltage by approximately 60°. Filament current transformers 16 and 17 supply the heating currents for the electrodes of the lamps 12 and 13, respectively. The transformers 16 and 17 are connected between the lines 11 and 10. that is to say that the lines voltage is operative at their primaries.

The electrode 19 of the lamp 12 is connected to the secondary 18 of the transformer 16. The electrode 21 of the lamp 13 is connected to the secondary 20 of the transformer 17. The electrode 23 of the lamp 12 is connected to the winding portion 22 of the transformer 16. The electrode 25 of the lamp 13 is connected to the winding portion 24 of the transformer 17.

This part of the figure description was concerned with the main circuit of the diagram. Hereinafter the control circuit will be described.

This control circuit consists of the following main parts. In the first place, a phase shift network 26 is connected at points 27 and 28 to the conductors 3 and 4. Secondly by a pair of transistor amplifiers 29. Thirdly a transformer 30 supplied from the lines. The phase shift network comprises a coil 31 which is connected in parallel with the connecting points 27 and 28. A capacitor 33 is connected to a tapping 32 on the coil 31. The other end of this capacitor is connected to a junction 34. This junction is connected at the one end through a variable resistor 35 to one end 36 of the coil 31 and at the other end through a series combination of a few electrical elements to the tapping 37 on the coil 31. The tapping 37 is located between the end 36 of the coil 31 and the tapping 32 on this coil. From the junction 34 to the tapping 37, two Zener diodes 38 and 39 and a coil 40 are serially connected. The series combination of the Zener diodes 38 and 39 is bridged by the primary 41 of a transformer. This transformer has two secondaries 42 and 43. One end 44 of the winding 42 is connected to the base of a transistor 45. The other end of the winding 42 is connected through a current-limiting resistor 46 to the emitter of the transistor 45. This emitter is also connected to the cathode of the controlled recifier 6. The collector of the transistor 45 is connected to one end of a secondary 47 of the transformer 30. The other end of the secondary 47 is connnected in series with the diode 48 and the resistor 49 to the control electrode of the rectifier 6. For the protection of the rectifier 6, a Zener diode 50 is connected in parallel with the winding 47, the diode 48 and the resistor 49. In exactly the same manner, the end 51 of the secondary 43 is connected to the base of a transistor 52. The other end of the winding 43 is connected through a resistor 53 to the emitter of the transistor 52. The said emitter is also in electrical contact with the cathode of the rectifier 7. The collector of the transistor 52 is connected, in the same manner as in the case of transistor 45, to the secondary of transformer 30, that is to say to one end of the secondary 54. The other end of the winding 54 is connected through a diode 55 and a resistor 56 to the control electrode of the rectifier 7. For the protection of the last-mentioned rectifier, a Zener diode 57 is connected in parallel with the winding 54, the diode 55 and the resistor 56.

The primary of the transformer 30 is shunted by a capacitor 58. This parallel combination is connected in series with a resistor 59 to the conductors 3 and 4. The resistor 59 is connected through a connecting terminal 60 to the conductor 4, while the other connecting terminal of the transformer is connected through a connecting terminal 61 to the conductor 3. The last-mentioned resistor and the capacitor are proportioned so that a voltage is induced in the secondaries 47 and 54 of the transformer 30 which lags by approximately 30° with respect to the voltage across the conductors 3 and 4.

This description of the main circuit and the control electrode circuit is followed by a further explanation of the operation of this arrangement.

In a given position of the variable resistor 35 of the phase shift network 26, the phase of the voltage across the terminals 34 and 37 of the series combination 38–40 lags by a given angle with respect to the supply voltage. When the supply voltage now reaches a higher value, the voltage across terminals 34–37 increases approximately by the same percentage. The voltage across the series combination of the two Zener diodes 38 and 39, however, substantially retains its value. This means that the additional voltage across the series combination is absorbed by the coil 40. This change in the electric conditions of the series combination results in an increase of the phase angle between the current in this series circuit and the voltage across this circuit (the voltage 34–37). As a result, also the voltage across the two Zener diodes lags considerably with respect to the voltage across terminals 34–37. This means that the voltage at the primary 41, which is square as a result of the breakdown of the Zener diodes, lags in phase. This phase lag is now transferred to the secondaries 42 and 43 which in turn render the transistors 45 and 52 conducting only at later instants. When the transistor 45 is rendered conducting, a current begins to flow through the winding 47, which current returns through the diode 48, the resistor 49, the control electrode of rectifier 6, the cathode of rectifier 6 and the emitter of transistor 45 and the collector of this transistor to the secondary 47. The fact that it is possible for such a current to flow is also due to the voltage produced in this circuit by the transformer 30 during the conducting period of transistor 45. The said transistor current renders the rectifier 6 conducting. In quite the same manner, the transistor 52 is rendered conducting by the voltage in the secondary 43, as a result of which the rectifier 7 is rendered conducting at suitable time intervals.

The control voltage of the rectifier 7 lags by 180° in phase with respect to the control voltage of the rectifier 6.

Reconsidering the influence of an increase in supply voltage on the enlargement of the phase angle in the series combination 34–37, it is apparent from the circuit arrangement that this increase in supply voltage produces a delay in the instant at which the transistors 45 and 52 become conducting. As a result, the instant at which the controlled rectifiers 6 and 7 become conducting also is delayed. This has the following influence on the load. A higher supply voltage tends to become manifest on the one hand in a higher load current and on the other hand in an enlargement of the phase angle between the load current and the supply voltage. Owing to the aforesaid effects of the control electrode circuit, as a result of which an increase in supply voltage caused the rectifiers to be controlled so that their conducting periods are shortened, the tendency to increase the power absorption of the load is counteracted.

In the present practical embodiment, the incomplete imitation is realized as follows. The supply voltage was 220 v., the operating voltage of the tube was 103 v., the supply voltage across the series coil 14 or 15 of the load was 170 v. The voltage across the series combination 34–37 of the control circuit was 38 v. The voltage across the Zener diodes was 19 v. The voltage across the coil 40 of the series combination was 30 v. The quotient in the series combination 38/19=2 consequently was smaller than the quotient of the load, that is to say 220/103=2.13.

In the foregoing, it has invariably been assumed that the resistor 35 of the phase shift network has been adjusted to a constant value. However, when the value of this resistor is varied, the phase of the voltage at 34–37 varies. The value of the voltage between these two points, however, is substantially independent of the value of the resistor 35. A variation of the phase at the terminals 34 and 37 involves a corresponding phase shift of the voltage across the series-connected Zener diodes 38, 39. This phase variation indicates a variation of the instants at which the transistors become conducting and hence also a variation of the instants at which the rectifiers 6 and 7 become conducting. Consequently, this means that with a variation of the adjustment of the resistor 35, the power absorption of the load is adjusted to another value. In the embodiment shown, in which the load is constituted by discharge lamps 12, 13 . . . , this means that a variation of the adjustment of the resistor 35 involves a dimming to a lesser or greater extent of the lamps.

Figure 3:
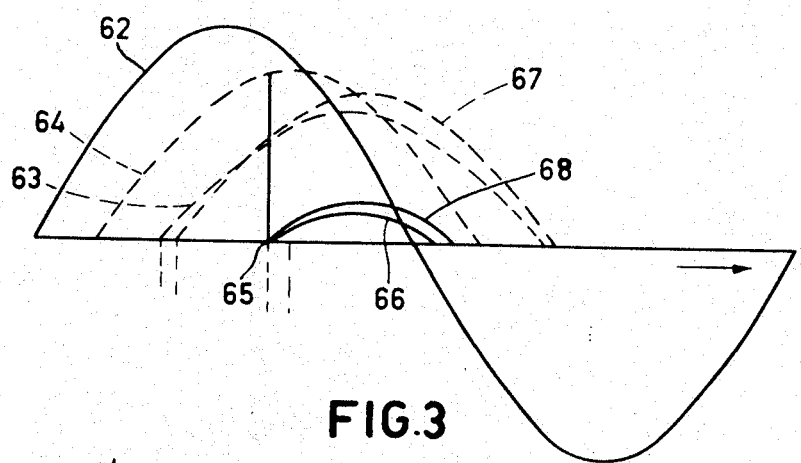
FIGS. 3 and 4 are graphs of the current-voltage variation of a controlled rectifier of the arrangement shown in FIG. 1.

In FIG. 3, reference numeral 62 denotes the variation of the supply voltage as a function of time. The axis indicated by an arrow in this figure is the time axis. Reference numeral 63 denotes the load current in the case where the rectifiers are constantly conducting. This load current lags in phase by, for example, approximately 60° with respect to the supply voltage 62. Reference numeral 64 designates the sinusoidal voltage which is induced in one of the secondaries of the transformer 30. The instant at which the concerned rectifier becomes conducting is designated by 65. In the presence of the indicated supply voltage 62, the load current is represented as a function of time by the current 66.

If the amplitude of the supply voltage should exceed the amplitude of the curve 62, in the case where the rectifiers had invariably been conducting, the load current would shift from 63 to, for example, 67. This would result in that the load current would yield the curve 68 at the instant 65 at which the rectifier would become conducting. As is apparent from FIG. 3, the maximum amplitude of the curve 68 exceeds that of 66. Moreover, the total duration of the load current in the case of curve 68 exceeds that of 66. The load current and hence the power absorption of the gas discharge tubes will become excessively high as a result of an increase in supply voltage.

Figure 4:
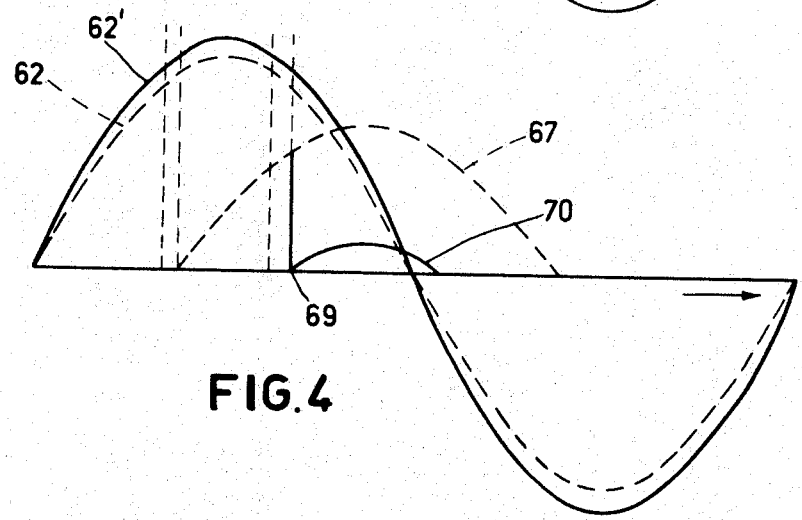

FIG. 4 represents graphically the manner in which the aforesaid influences of the supply voltages are counteracted by delaying the instant at which the rectifier becomes conducting. In this figure also, reference numeral 62 denotes the original supply voltage. The curve 62' designates the new supply voltage. However, the rectifier is now rendered conducting at a later instant, that is to say at the instant 69, the angle between 69 and 65 exceeding the phase angle shift between the currents 67 and 63. The load current 70 associated with the new instant 69 is graphically represented in FIG. 4. This load current 70 has a value and a duration such that the power absorption of the gas discharge tubes has remained substantially unchanged despite the increase in supply voltage.

Figure 2:
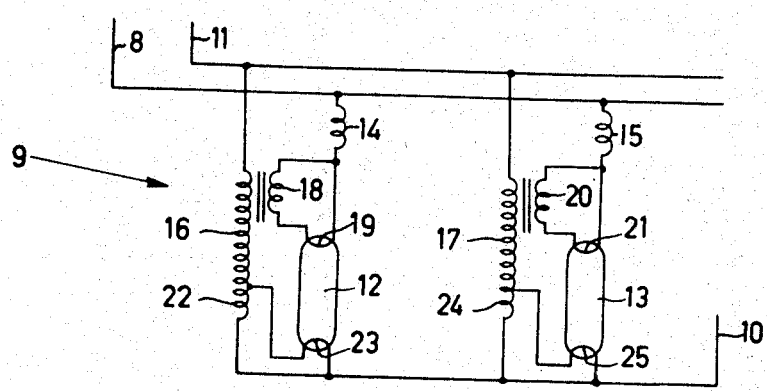
FIG. 2 is a diagram of the electrical load of this arrangement.

In FIG. 2, only two gas discharge tubes are shown. It will be obvious that a greater number of these tubes may be supplied by the novel control circuit disclosed above.

What is claimed is:

1. A regulator circuit for coupling a source of AC voltage to a non-linear load including a reactance component, said circuit comprising first and second controlled rectifiers each of which includes first and second electrodes defining a current path therein and a control electrode for controlling the flow of current in said path, means connecting said controlled rectifiers in inverse-parallel relationship in series with said voltage source and said load, and a control circuit, said control circuit comprising input means adapted to be coupled to said A.C. voltage source, phase shifting means coupled to said input means for adjusting the firing angle of said controlled rectifiers, compensating means coupled to said phase shifting means and comprising a non-linear element having a constant voltage region in its I–V characteristic above a given voltage level connected in series with a reactance element of the same type as the load reactance, said compensating means being responsive to a variation in said A.C. voltage for deriving a control voltage across the terminals of said non-linear element which varies in phase relative to said A.C. voltage in a sense so as to control the conductive periods of said controlled rectifiers to maintain the power supplied to said load approximately constant despite said variation in the A.C. voltage, and output means coupled to the control electrodes of said first and second rectifiers for supplying said control voltage thereto.

2. A circuit as described in claim 1 wherein said non-linear element comprises a pair of oppositely poled Zener diodes connected in series, said compensating means being arranged to supply a constant amplitude control voltage which varies in phase relative to said A.C. voltage in the same sense as the load current varies relative to said A.C. voltage in response to said variation in the A.C. voltage.

3. A circuit as described in claim 1 wherein said load comprises a gas or vapor discharge tube connected in series with a first inductor and the reactance element of said compensating means comprises a second inductor, the impedance values of the components of said compensating means relative to said load being chosen so that the quotient of the voltage across the series combination of said non-linear element and said second inductor to the voltage across said non-linear element is smaller than the quotient of the voltage across the series combination of the tube and said first inductor to the voltage across said tube.

4. A circuit for regulating the power supplied from an unregulated source of A.C. voltage to a load circuit that comprises a first non-linear element connected in series with a first reactance element, said circuit comprising first and second controlled rectifiers each of which includes first and second electrodes defining a current path therein and a control electrode for controlling the flow of current in said path, means connecting said controlled rectifiers in inverse-parallel relationship, means connecting said rectifiers and load circuit in series across said voltage source, a variation in said A.C. voltage normally producing a change in the phase angle between the load current and said A.C. voltage, a control circuit responsive to said variation in A.C. voltage for supplying to the control electrodes of said first and second rectifiers a phase shiftable control voltage, said control circuit including compensating means comprising a second non-linear element connected in series circuit with a second reactance element of the same type as said first reactance element, the resistance of said second non-linear element above a given voltage level being approximately inversely proportional to the current therein, means coupling said series circuit across said voltage source so that said A.C. voltage variation produces across said second non-linear element a control voltage which varies in phase in the same sense as said change in phase angle of the load current, and means for effectively coupling said control voltage to the control electrodes of said first and second rectifiers so as to control the conduction periods thereof, thereby to regulate the power supplied to said load circuit.

5. A circuit as described in claim 4 wherein said second non-linear element comprises a pair of Zener diodes serially connected with opposite polarities.

6. A circuit as described in claim 4 wherein said load circuit comprises a gas or vapor discharge tube connected in series with a first inductor, and wherein said second reactance element comprises a second inductor.

7. A circuit as described in claim 4 wherein said control circuit further comprises an adjustable phase shift network coupled to said compensating means for adjusting the phase angle between said control voltage and said A.C. voltage to a given value corresponding to the desired load power.

8. A circuit as described in claim 6 wherein the circuit parameters are chosen so that the quotient of the voltage across said compensating means divided by the voltage across said second non-linear element is smaller than the quotient of the A.C. voltage divided by the tube operating voltage.

9. A circuit for regulating the power supplied from a source of A.C. voltage to a non-linear load including a reactance component, said load exhibiting a given response characteristic to a given variation of said A.C. voltage, said circuit comprising first and second controlled rectifiers each of which includes first and second electrodes defining a current path therein and a control electrode for controlling the flow of current in said path, means connecting said controlled rectifiers in inverse-parallel relationship in series with said voltage source and said load, a control circuit coupled across said voltage source and including a network which is the image of said load and exhibits a response characteristic similar to that of the load for said given A.C. voltage variation, said network comprising a non-linear element having a constant voltage region in its I–V characteristic above a given voltage level connected in series with a reactance element of the same type as the load reactance, and means for applying the voltage developed across said non-linear element to the control electrodes of said first and second rectifiers in a sense to alter the conduction periods thereof so as to counteract a change in the power supplied to said load caused by said given A.C. voltage variation.

References Cited

UNITED STATES PATENTS

| | | | |
|---|---|---|---|
| 2,829,282 | 4/1958 | Hughes et al. | 307—88.5 |
| 3,142,781 | 7/1964 | Izenour | 315—196 |
| 3,205,404 | 9/1965 | Kurata et al. | 315—194 |

JOHN W. HUCKERT, *Primary Examiner.*

J. D. CRAIG, *Assistant Examiner.*